(12) United States Patent
Chiang

(10) Patent No.: US 8,238,685 B2
(45) Date of Patent: Aug. 7, 2012

(54) IMAGE NOISE REDUCTION METHOD AND IMAGE PROCESSING APPARATUS USING THE SAME

(75) Inventor: Ming-Feng Chiang, Miaoli County (TW)

(73) Assignee: Novatek Microelectronics Corp., Hsinchu (TW)

( * ) Notice: Subject to any disclaimer, the term of this patent is extended or adjusted under 35 U.S.C. 154(b) by 633 days.

(21) Appl. No.: 12/426,289

(22) Filed: Apr. 20, 2009

(65) Prior Publication Data

US 2010/0104180 A1    Apr. 29, 2010

(30) Foreign Application Priority Data

Oct. 28, 2008    (TW) .................. 97141464 A

(51) Int. Cl.
*G06K 9/40*    (2006.01)
(52) U.S. Cl. ........ 382/265; 382/167; 348/286; 386/313; 399/294
(58) Field of Classification Search .................. 382/167, 382/254, 265; 348/286; 386/313; 399/294
See application file for complete search history.

(56) References Cited

U.S. PATENT DOCUMENTS

| | | | |
|---|---|---|---|
| 5,602,934 A * | 2/1997 | Li et al. .......................... | 382/128 |
| 6,459,455 B1 * | 10/2002 | Jiang et al. ..................... | 348/452 |
| 2005/0002652 A1 * | 1/2005 | Hartung et al. ................ | 386/114 |
| 2007/0172146 A1 * | 7/2007 | Guan .............................. | 382/275 |

FOREIGN PATENT DOCUMENTS

CN    101009771    8/2007

OTHER PUBLICATIONS

Waltz et al.; "An efficient algorithm for Gaussian blur using finite-state machines"; Nov. 1998; SPIE Conf. on Machine Vision Systems for Inspection and Metrology VII.*
"First Office Action of China Counterpart Application", issued on Jan. 11, 2011, p. 1-p. 5.
Lin et al., "A sliding based edge detection technique for grey level images", National Science Council Substituted Research Program Report, Oct. 10, 2008, pp. 1-5.
Miller et al., "Software Implementation of 2-D Grey-Level Dilation Using Skipsm", SPIE Conf. on Machine Vision Applications, Architectures, and Systems Integration VI, Jan. 1998, pp. 1-8.
"Office Action of Taiwan Counterpart Application", issued on Apr. 20, 2012, pp. 1-7, in which the listed references were cited.

* cited by examiner

*Primary Examiner* — Chan S Park
*Assistant Examiner* — Eueng-Nan Yeh
(74) *Attorney, Agent, or Firm* — Jianq Chyun IP Office

(57) ABSTRACT

An image noise reduction method is provided. An image is received. A first-stage process is performed to the image to obtain a luminance information Y and a color information Cb and/or Cr corresponding to a pixel array in an YCbCr domain. A second-stage process is performed to the luminance information Y to reduce at least a luminance noise. A third-stage process is performed to the color information Cb and/or Cr to reduce at least a color noise. The luminance information Y and the color information Cb and/or Cr are then combined.

12 Claims, 4 Drawing Sheets

IMAGE NOISE REDUCTION METHOD AND IMAGE PROCESSING APPARATUS USING THE SAME

CROSS-REFERENCE TO RELATED APPLICATION

This application claims the priority benefit of Taiwan application serial no. 97141464, filed Oct. 28, 2008. The entirety of the above-mentioned patent application is hereby incorporated by reference herein and made a part of specification.

BACKGROUND OF THE INVENTION

1. Field of the Invention

The present invention generally relates to an image processing technique, and more particularly, to an image compression technique wherein a luminance information Y and a color information Cb and/or Cr are respectively filtered.

2. Description of Related Art

A more effective image processing technique is required due to the development of digital cameras in recent years. Usually, a user has to take a digital color photo with low luminance in order to achieve an anti-shake effect. As a result, the requirement to the noise reduction performance at high ISO value is increased. Generally speaking, the lower the ISO value is, the less noise is produced, and the higher the ISO value is, the more noises are produced. Thereby, how to suppress image noises, especially color noises, produced by high ISO value has become a major subject in the industry.

Generally speaking, a digital image processor should have at least a sensor interface module, an image pipeline module, a scalar module, and a JPEG module to process a digital photo. The digital photo can be converted into a compressed image file through the operations of these modules.

Generally speaking, an image output by a sensor is a pixel array in a RGGB Bayer pattern or CMYG pattern. The image is first converted by the image pipeline module into a RGB image and then an YCbCr image. After that, the image is resized by the scalar module and then compressed by the JPEG module into a JPG file.

However, in the conventional image processing technique, the luminance noise and color noise in the image are not effectively suppressed.

SUMMARY OF THE INVENTION

Accordingly, the present invention is directed to an image processing mechanism, wherein a luminance information Y and a color information Cb and/or Cr are respectively filtered in the YCbCr domain.

The present invention provides an image noise reduction method including following steps. An image is received. A first-stage process is performed to the image to obtain a luminance information Y and a color information Cb and/or Cr corresponding to a pixel array in the YCbCr domain. A second-stage process is performed to the luminance information Y to reduce at least a luminance noise. A third-stage process is performed to the color information Cb and/or Cr to reduce at least a color noise. The luminance information Y and the color information Cb and/or Cr are then combined.

According to an embodiment of the present invention, in the image noise reduction method, the second-stage process and the third-stage process are respectively performed through a Pascal triangle low-pass filtering method.

According to an embodiment of the present invention, in the image noise reduction method, the Pascal triangle low-pass filtering method includes: dividing each data stream in a first direction of the pixel array into a first data portion and a second data portion, wherein the first data portion is a current unprocessed data of the pixel array, the second data portion shifts n pixels relative to the first data portion, $n \geq 1$, and n pixels of the second data portion which exceed a boundary region of the pixel array are set to be a predetermined value; averaging the first data portion and the second data portion to obtain a low-pass filter image; and performing a recurrence process according to the low-pass filter image and foregoing steps to achieve a desired number of filter orders.

According to an embodiment of the present invention, the image noise reduction method further includes: dividing each data stream in a second direction of the pixel array into a first data portion and a second data portion, wherein the first data portion is a current unprocessed data of the pixel array, the second data portion shifts m pixels relative to the first data portion, $m \geq 1$, and m pixels of the second data portion which exceed a boundary region of the pixel array are set to be a predetermined value; averaging the first data portion and the second data portion to obtain a low-pass filter image; and performing a recurrence process according to the low-pass filter image and foregoing steps to achieve a desired number of filter orders and a two-dimensional image filtering process.

According to an embodiment of the present invention, in the image noise reduction method, the desired number of filter orders is fixed or selected externally.

According to an embodiment of the present invention, the image noise reduction method further includes a boundary judgment mechanism for determining a boundary region and adjusting the desired number of filter orders according to the boundary region.

According to an embodiment of the present invention, in the image noise reduction method, the desired number of filter orders corresponding to the boundary region may be adjusted externally.

According to an embodiment of the present invention, after processing a low-pass filter image through the Pascal triangle low-pass filtering method, the image noise reduction method further includes performing a weighting process to the low-pass filter image and a high-pass filter image of the image.

The present invention provides a Pascal triangle low-pass filtering method for at least filtering pixels on a column or a row of an image, wherein the number of the pixels is p. The Pascal triangle low-pass filtering method includes: obtaining the pixels as a first data portion; obtaining the $n^{th}$ pixel to the $p^{th}$ pixel among the pixels and n boundary pixels as a second data portion, wherein $n \geq 1$, and a specific value is filled in the n boundary pixels; averaging the first data portion and the second data portion to obtain a low-pass filter image; and performing a recurrence process according to the low-pass filter image and foregoing steps to achieve a desired number of filter orders.

According to an embodiment of the present invention, in the Pascal triangle low-pass filtering method, the specific value filled in the n boundary pixels is the same as the $p^{th}$ pixel.

The present invention provides an image processing apparatus, wherein the image processing apparatus includes a processing unit for receiving an image and performing an image process to the image. The image process includes following steps. A first-stage process is performed to the image to obtain a luminance information Y and a color information Cb and/or Cr corresponding to a pixel array in the YCbCr domain. A second-stage process is performed to the luminance information Y to reduce at least a luminance noise. A third-stage process is performed to the color information Cb and/or Cr to reduce at least a color noise. The luminance information Y and the color information Cb and/or Cr are then combined.

According to an embodiment of the present invention, in the image processing apparatus, the second-stage process and the third-stage process are respectively performed through a Pascal triangle low-pass filtering method.

The Pascal triangle low-pass filtering method is carried out as described above.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
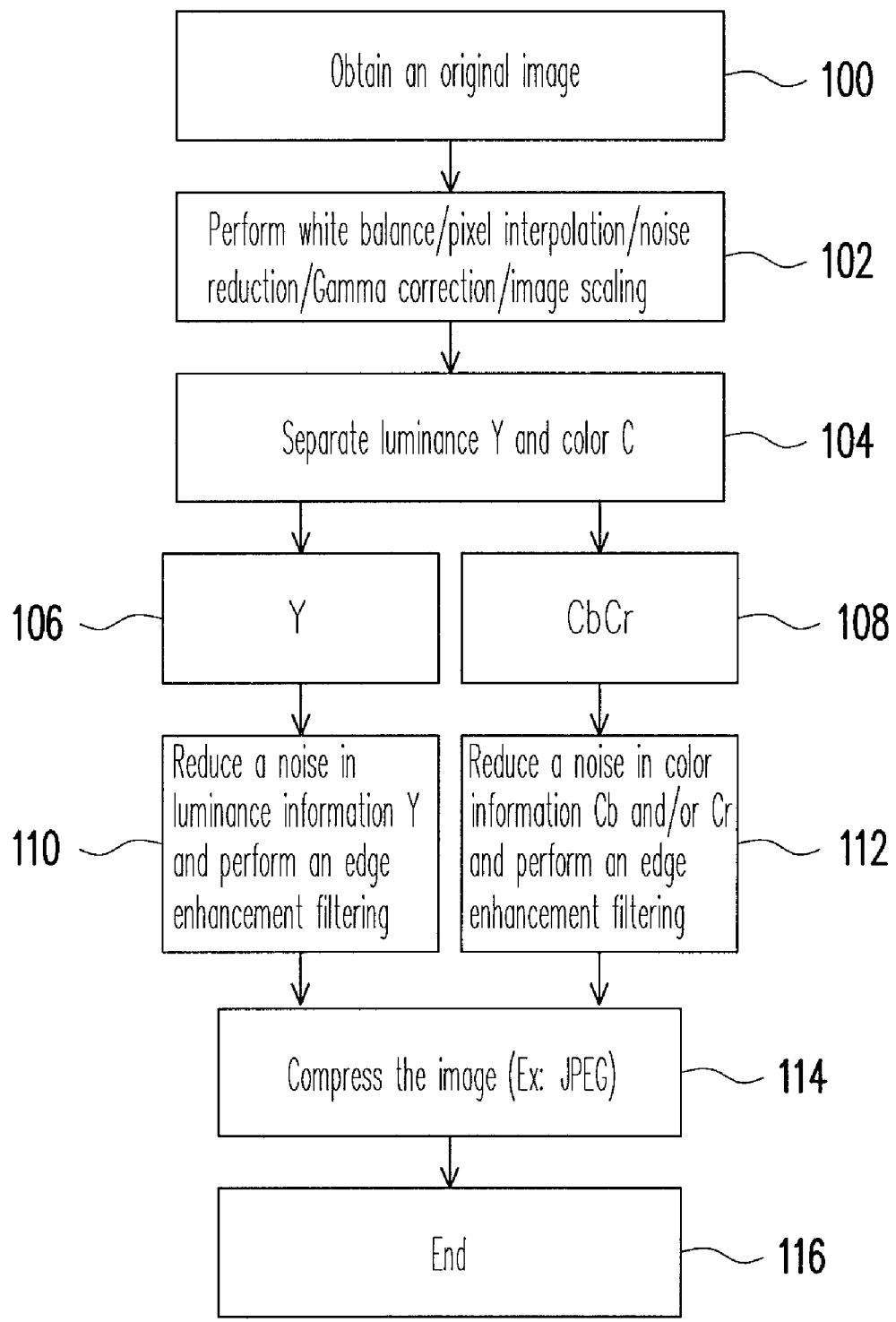
FIG. 1 is a diagram of an image processing method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides an image processing mechanism. In the YCbCr domain, a filter with adjustable number of orders is accomplished by using an arithmetic processing accelerator, and a low-pass filter with adjustable number of orders and boundary judgment is accomplished by corresponding different order numbers to different frequencies. As a result, luminance and color noises at different frequencies in an image can be effectively reduced, and the edge of the image can be enhanced through deformation calculation.

In the present invention, an image is substantially divided into a luminance Y and a color C. Generally speaking, change of color is not as intense as change of luminance. Namely, the spatial frequency of color is much lower than that of luminance. Based on such an image characteristic, the present invention provides a low-pass filter with boundary judgment by respectively corresponding different order numbers to luminance and color. A low-pass filter with higher order number is adopted for reducing color noises, and a low-pass filter with lower order number is adopted for reducing luminance noises. Thereby, the visual effect of the image can be improved, and the edge of the image can be prevented from being blurred.

Figure 2:
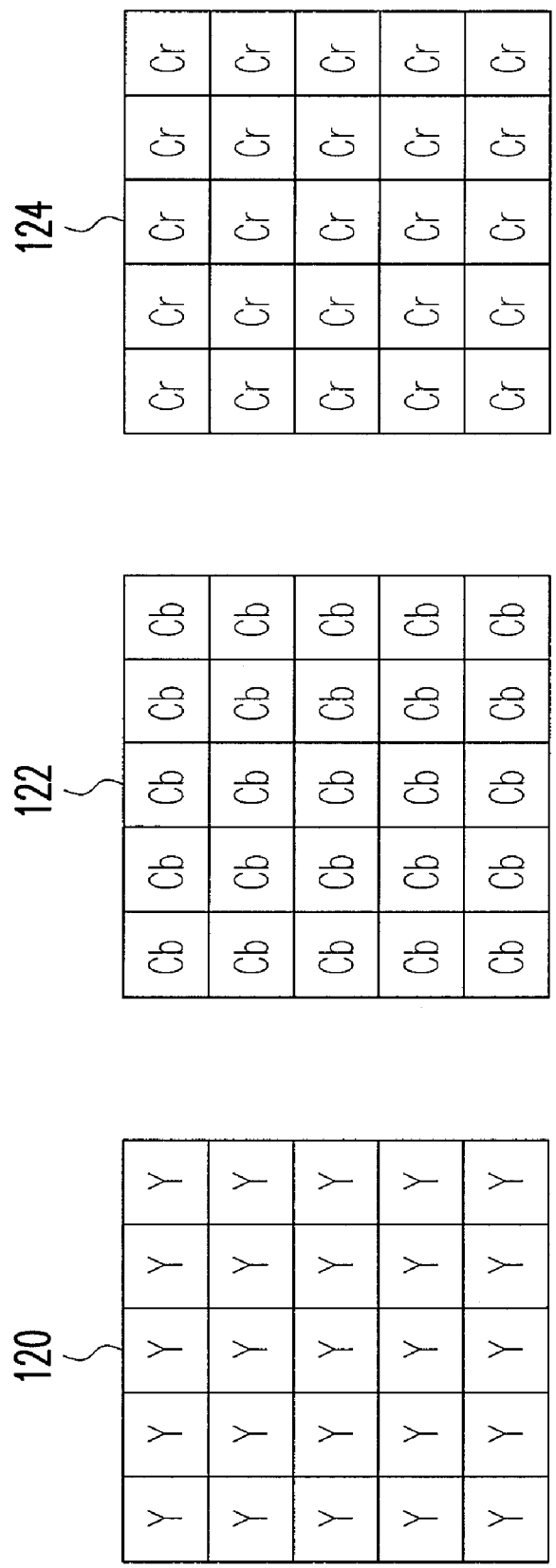
FIG. 2 illustrates the distributions of a luminance information Y, a color information Cb, and a color information Cr corresponding to a pixel array.

FIG. 1 is a diagram of an image processing method according to an embodiment of the present invention. Referring to FIG. 1, the image processing method in the present invention is suitable for an image processing apparatus. The image processing apparatus may be a digital camera, an imaging apparatus, or a computer processing system, wherein an optimal image quality is obtained through hardware or software processing. In step 100, an original file of an image is obtained through an image sensor module in a digital camera. In step 102, a first-stage process (for example, white balance, pixel interpolation, noise reduction, Gamma correction, and resizing, etc) is performed to the image obtained in step 100. In step 104, the image is separated in the YCbCr domain into a luminance Y and a color C. In step 106, a luminance information Y corresponding to a pixel array is obtained, and in step 108, a color information C corresponding to the pixel array is obtained. FIG. 2 illustrates the distribution of the luminance information Y and the color information Cb and Cr corresponding to the pixel array. The pixel array 120 corresponding to the luminance information Y contains luminance pixels. The pixel array 122 corresponding to the color information Cb contains Cb pixels. The pixel array 124 corresponding to the color information Cr contains Cr pixels. The pixel arrays Cb and Cr may also be combined into a single pixel array CbCr. Each of foregoing pixel arrays has to be respectively filtered.

In step 110, a noise in the luminance information Y is suppressed. An edge enhancement filtering may be further performed in step 110 to display the edges of objects in the image more clearly. In step 112, a noise in the color information Cb and/or Cr is suppressed. Similarly, an edge enhancement filtering may be farther performed in step 112 to display the edges of objects in the image more clearly. Steps 110 and 112 will be described in detail below.

The processed luminance information Y and color information Cb and/or Cr are then combined and compressed into a general JPEG/JPG image file in step 114. After that, the image file is output in step 116. Step 114 is a general image processing step. However, according to the present invention, noises in the image have been effectively eliminated and accordingly the quality of the image is improved.

The luminance information Y and the color information Cb and/or Cr have different image effects. For example, in the conventional technique, the color information at the edge of an object is always blurred. While in the present invention, a filter which is easy to implement and has adjustable number of filter orders is adopted in steps 110 and 112, wherein the filter is referred to as a Pascal triangle low-pass filter.

Figures 3, 4:
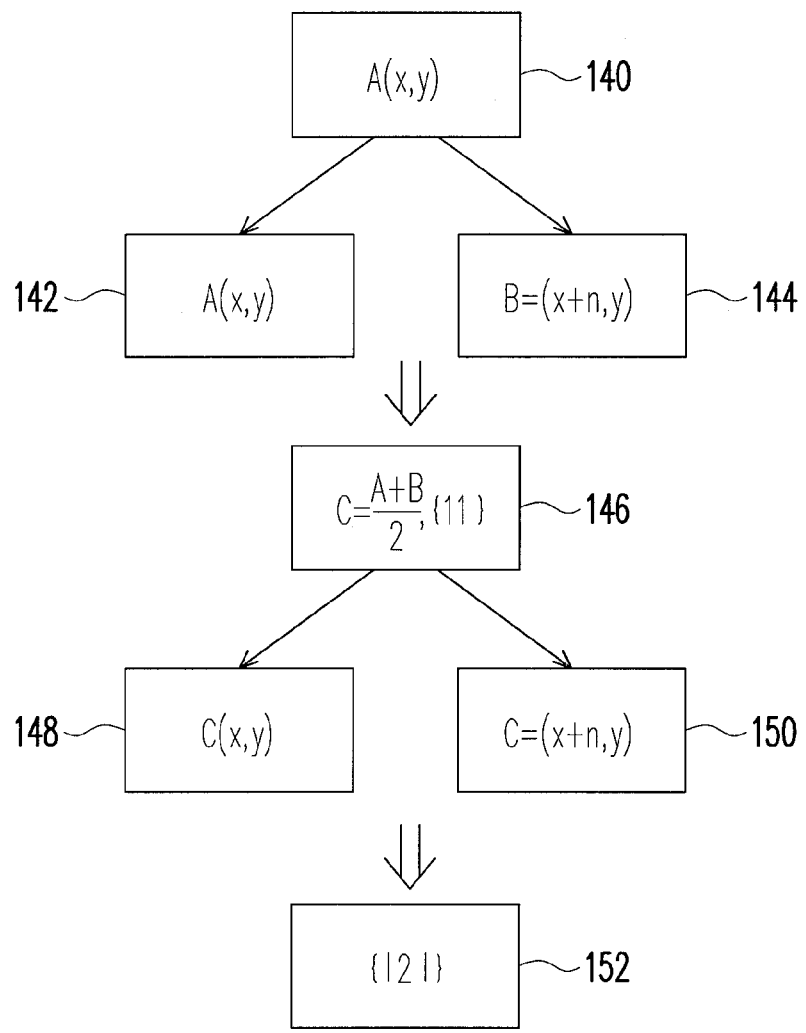
FIG. 3 illustrates a coefficient relationship of a Pascal triangle.
FIG. 4 is a diagram of a filtering mechanism of a Pascal triangle low-pass filter in a direction x according to an embodiment of the present invention.

FIG. 3 illustrates a coefficient relationship of a Pascal triangle. The coefficient relationship of a Pascal triangle is a well-known mathematical knowledge, wherein the coefficients at each order can be deduced based on certain rules. In an embodiment of the present invention, the filtering pattern of a low-pass filter also presents a regular Pascal triangle pattern along with the increase in the order number. Accordingly, such a low-pass filter is referred to as a Pascal triangle low-pass filter, and the number of filter orders thereof is adjustable, wherein the number of filter orders has a default value but may also be adjusted externally by a user to accomplish a desired image effect.

A Pascal triangle low-pass filter with adjustable order number will be described below with reference to an embodiment of the present invention; however, this embodiment is not intended to limiting the scope of the present invention. FIG. 4 is a diagram of a filtering mechanism of a Pascal triangle low-pass filter in a direction x according to an embodiment of the present invention. Referring to FIG. 4, a pixel array 140 corresponding to an image is represented by A(x,y), wherein the parameters x and y are corresponding to positions of pixels. A(x,y) represents a pixel in a pixel array having a resolution PxQ.

Noises in the image corresponding to the pixel array A(x,y) are to be eliminated. Regarding the filtering of a next order (i.e., the order {11}), the original pixel array 140 is served as a first data portion A. First, noise reduction in the forward direction of the direction x will be described. However, noise reduction in the backward direction of the direction x is similar. The resolution in the direction x is p (i.e., there are pixels 0~p−1). A second data portion B(x+n, y) is obtained by shifting the original pixel array A(x,y) for n pixels. Namely, the $n^{th}$~(p−1)th pixels are served as the $0^{th}$~(p−1−n)th pixels in the second data portion B. Since there are p pixels in the direction x, the $(p-n)^{th}$~$(p-1)^{th}$ pixels in the second data portion B are a boundary region and which are filled in with a specific value. The boundary region may be filled in with the same value, such as the last pixel in the pixel array A(x,y).

Then, regarding the filtering of the order {11}, the first data portion A and the second data portion B are averaged to obtain a first-order filter image C, namely, C=(A+B)/2. Next, foregoing process is recurred to accomplish the filtering of the next order {121}. Similarly, a first data portion C(x,y) and a second data portion C(x+n, y) are obtained from the first-order filter image C. Next, the two data portions are averaged to obtain an image at the order {121}, namely, a second-order filter image 152. Similarly, the filters at the other orders can be accomplished by recurring foregoing process for the desired number of times.

Figure 5:
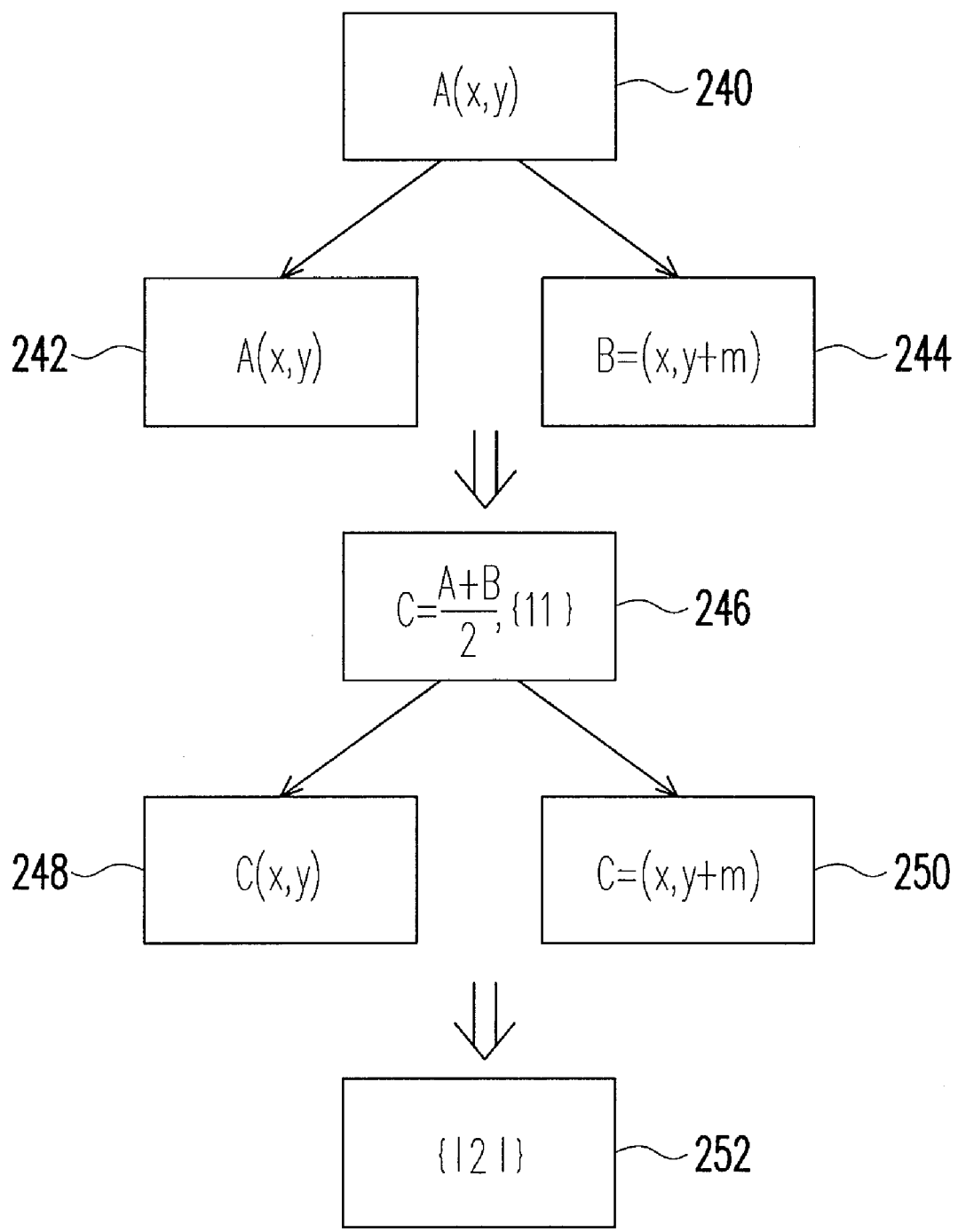
FIG. 5 is a diagram of a filtering mechanism of a Pascal triangle low-pass filter in a direction y according to an embodiment of the present invention.

A one-dimensional filtering method in the direction x is described above, and the same filtering method can be carried out in the direction y. FIG. 5 is a diagram of a filtering mechanism of a Pascal triangle low-pass filter in the direction y according to an embodiment of the present invention. The original pixel array A(x,y) is served as the first data portion A(x,y). Noise reduction in the forward direction of the direction y will be described. However, noise reduction in the backward direction of the direction y is similar. The resolution in the direction y is q (i.e., there are pixels 0~q−1). A second data portion B(x, y+m) is obtained by shifting the original pixel array A(x,y) for m pixels. Namely, the $m^{th}$~$(q-1)^{th}$ pixels are served as the $0^{th}$~$(q-1-m)^{th}$ pixels in the second data portion B. Since there are q pixels in the direction y, the $q^{th}$~$(m~q-1)^{th}$ pixels in the second data portion B are a boundary region in the direction y and which are filled in with a specific value.

Next, regarding the filtering at the order {11}, the first data portion A and the second data portion B are averaged to obtain a first-order filter image C, namely, C=(A+B)/2. Similarly, images C(x,y) and C(x, y+m) are obtained by recurring foregoing process, and accordingly a filter image at the next order {121} (i.e., the second-order filter image 252) is obtained. Filtering at the other orders can be accomplished by recurring foregoing process for a desired number of times.

A one-dimensional filtering method is described above. A filter may simply process a pixel data stream, such as a pixel column or a pixel row.

However, since an image is a two-dimensional pixel array, a two-dimensional filtering effect is required to process the image. The two-dimensional filtering effect can be achieved by performing foregoing filtering method in a single direction (for example, the direction x or the direction y) and then performing the same in the other direction. Besides, the two-dimensional filtering effect may also be achieved by finishing the filtering of the desired number of orders in a first direction and then carrying out the filtering in the second direction. However, the present invention is not limited to foregoing methods. Additionally, the two-dimensional filtering effect may also be achieved by alternatively recurring foregoing process for one or multiple times in the two directions.

The distribution of the two-dimensional coefficients at the order {121} is as following:
1 2 1
2 4 2
1 2 1.
The distribution of the two-dimensional coefficients at the order {1331} is as following:
1 3 3 1
3 9 9 3
3 9 9 3
1 3 3 1.
Similarly, the distributions of the two-dimensional coefficients at other orders may also be obtained through the same method. Besides, the filter orders in the direction x and the direction y may be the same or different.

In addition, through an object edge judgment mechanism, a specific block in the image may be further filtered at other orders. In other words, different blocks in an entire image are respectively filtered for appropriate numbers of orders. Moreover, the entire image is first filtered for the same number of orders, and the specific object edge is further filtered. In other words, different filtering methods can be adopted according to the same Pascal triangle filtering mechanism.

Regarding the hardware implementation of the image noise reduction method in the present invention, due to the limitation of hardware structure and cost, the number of orders in finite impulse response (FIR) is usually limited. The present invention provides a method for infinitely increasing the order number, and an image processing accelerator is adopted in this method. The image processing accelerator performs arithmetic calculations to two image sources A and B and stores the calculation results into an image source C. For example, C=A/2+B/2. Low-pass filters with adjustable order number are accomplished in both a horizontal and a vertical direction through calculations performed on B(x,y)=A(x+n,y) or B(x,y)=A(x, y+m) and A(x,y). The parameters n and m may be the same or different. For example, n=1, 2, . . . ; m=1, 2, . . . .

How to obtain the desired number of filter orders by averaging two data portions and recurring a filtering process will be described herein with reference to an example. A(x,y) represents an image block starting from the coordinates (x,y). Herein a PxP block is taken as an example. As shown in FIG. 4, one pixel is shifted (i.e., n=1), and x=0~P−1, y=0~P−1.

A1(x,y)=A(x,y) is selected as the first data portion, and B1(x,y)=A(x+1,y) is selected as the second data portion. Then, C=(A1+B1)/2. Accordingly, C1(x,y)=(A(x,y)+A(x+1, y))/2, and accordingly a Gaussian fuzzy filter at the order {11} is obtained.

Next, foregoing calculations are repeated starting from C1(x,y), and B2(x,y)=C1(x+1,y), A2(x,y)=C1(x,y). The B2(x,y) and the A2(x,y) are averaged: C2(x,y)=(A2+B2)/2=(C1(x,y)+C1(x+1))/2=(A(x,y)+2*A(x+1,y)+A(x+2,y))/4, and accordingly a filter at the order {121} is obtained.

Foregoing calculations are repeated starting from C2(x,y) to achieve a filter at the order {1331}. A filter at the order {14641} is obtained if the calculations are repeated one more time. In other words, a filter at any order can be obtained without actually increasing the number of hardware filters. The number of the recurrences can be adjusted at any time.

The complete process may be expressed with following arithmetic expressions:

I[n] is the input image, which may be a luminance Y, a color Cb, or a color Cr.

I_Mod1[n] is the corrected input image.
I_Mod2[n] is the corrected input image.
I_Mod3[n] is the corrected input image.

LPF[I[n]] is the Gaussian fuzzy low-pass filter A, wherein different frequencies can be selected by adjusting the order number.

G_ForEdge[n] is the Gaussian fuzzy low-pass filter B, wherein different frequencies can be selected by adjusting the order number.

EdgeMap{.} is an external selection parameter for eliminating unnecessary noises.

EhnEdgeMap{.} is another external selection parameter for eliminating unnecessary noises.

G_ForEdgeEhn[n] is the Gaussian fuzzy low-pass filter C, wherein different frequencies can be selected by adjusting the order number.

Det_Edge[n] is an edge detection output of the input image and which is standardized between 0 and 1. The high-frequency filter can detect edges at different frequencies by selecting low-pass filters corresponding to different frequencies.

EE_Edge[n] is the enhanced edge. The high-frequency filter can detect edges at different frequencies by selecting low-pass filters corresponding to different frequencies.

O[n] is the output image, wherein the luminance Y, the color Cb, or the color Cr may be output respectively.

$$Det\_Edge[n]=EdgeMap\{abs(I\_Mod1[n]-G\_ForEdge[n])\}.$$

$$EE\_Edge[n]=EhnEdgeMap(I\_Mod2[n]-G\_ForEdgeEhn[n]).$$

$$O[n]=(Det\_Edge0\_2[n]*(I\_Mod3[n]+EE\_Edge[n]))+((1-Det\_Edge[n])*LPF[I[n]).$$

The result of foregoing calculations is adjusted and output through a weighting method. Det_Edge0_2[n]*(I_Mod3[n]+EE_Edge[n])) is the original image along with the enhanced portion. ((1−Det_Edge[n])*LPF[I[n]) is the portion with the noises eliminated. Through foregoing arithmetic expressions, noises at different frequencies (for example, in luminance and color) can be reduced, and object edges at different frequencies can be enhanced. However, the application of the present invention is not limited to the example described above.

In the present invention, Gaussian fuzzy filters with different order numbers are adopted to generate low-pass filters corresponding to different frequencies. High-frequency filters corresponding different frequencies are then obtained through these low-pass filters corresponding to different frequencies through some simple conversions, for example, HPF{X[n]}=X[n]−LPF1{X[n]}. Thereby, control over noise reduction is made more flexible through adjustment between different frequencies.

The image noise reduction method provided by the present invention can be implemented in an image processing apparatus, such as a digital camera, for effectively reducing luminance and color noises in an image at different frequencies. Besides, object edges in the image can be enhanced. Furthermore, the image processing apparatus may also be a computer system for processing images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image noise reduction method, comprising:
   receiving an image;
   performing a first-stage process to the image to obtain a luminance information Y and a color information Cb and/or Cr corresponding to a pixel array in an YCbCr domain;
   performing a second-stage process with respect to the luminance information Y, to reduce at least a luminance noise;
   performing a third-stage process with respect to the color information Cb and/or Cr to reduce at least a color noise; and
   combining the luminance information Y and the color information Cb and/or Cr, wherein the second-stage process and the third-stage process are respectively performed through a Pascal triangle low-pass filtering method, and the Pascal triangle low-pass filtering method comprises:
   dividing each data stream in a first direction of the pixel array into a first data portion and a second data portion, wherein the first data portion is a current unprocessed data of the pixel array, the second data portion shifts n pixels relative to the first data portion, n≧1, n pixels of the second data portion which exceed a boundary region of the pixel array are set to be a predetermined value;
   averaging the first data portion and the second data portion to obtain a low-pass filter image; and
   performing a recurrence process according to the low-pass filter image and aforementioned steps to achieve a desired number of filter orders;
   determining a boundary region according to a boundary judgment mechanism; and
   adjusting the desired number of filter orders according to the boundary region.

2. The image noise reduction method according to claim 1 further comprising dividing each data stream in a second direction of the pixel array into a first data portion and a second data portion, wherein the first data portion is a current unprocessed data of the pixel array, the second data portion shifts m pixels relative to the first data portion, m≧1, m pixels of the second data portion which exceed the boundary region of the pixel array are set to be a predetermined value;
   averaging the first data portion and the second data portion to obtain a low-pass filter image; and
   performing a recurrence process according to the low-pass filter image and aforementioned steps to achieve a desired number of filter orders and a two-dimensional image filtering process.

3. The image noise reduction method according to claim 2, wherein n=1 and m=1.

4. The image noise reduction method according to claim 2, wherein n=m.

5. The image noise reduction method according to claim 1, wherein n=1.

6. The image noise reduction method according to claim 1, wherein the desired number of filter orders is fixed or selected externally.

7. The image noise reduction method according to claim 1, wherein the desired number of filter orders corresponding to the boundary region is adjusted externally.

8. The image noise reduction method according to claim 1, wherein after processing a low-pass filter image through the Pascal triangle low-pass filtering method, the image noise reduction method further comprises performing a weighting process to the low-pass filter image and a high-pass filter image of the image.

9. An image processing apparatus, comprising:
a processing unit, for receiving an image and performing an image process to the image, wherein the image process comprises:
performing a first-stage process to the image to obtain a luminance information Y and a color information Cb and/or Cr corresponding to a pixel array in an YCbCr domain;
performing a second-stage process to the luminance information Y to reduce at least a luminance noise;
performing a third-stage process to the color information Cb and/or Cr to reduce at least a color noise; and
combining the luminance information Y and the color information Cb and/or Cr,
wherein the second-stage process and the third-stage process are respectively performed through a Pascal triangle low-pass filtering method and the Pascal triangle low-pass filtering method comprise:
dividing each data stream in a first direction of the pixel array into a first data portion and a second data portion, wherein the first data portion is a current unprocessed data of the pixel array, the second data portion shifts n pixels relative to the first data portion, $n \geq 1$, n pixels of the second data portion which exceed a boundary region of the pixel array are set to be a predetermined value;
averaging the first data portion and the second data portion to obtain a low-pass filter image; and
performing a recurrence process according to the low-pass filter image and aforementioned steps to achieve a desired number of filter orders;
determining a boundary region according to a boundary judgment mechanism; and
adjusting the desired number of filter orders according to the boundary region.

10. The image processing apparatus according to claim 9, further comprising dividing each data stream in a second direction of the pixel array into a first data portion and a second data portion, wherein the first data portion is a current unprocessed data of the pixel array, the second data portion shifts m pixels relative to the first data portion, $m \geq 1$, m pixels of the second data portion which exceed a boundary region of the pixel array are set to be a predetermined value;
averaging the first data portion and the second data portion to obtain a low-pass filter image; and
performing a recurrence process according to the low-pass filter image and aforementioned steps to achieve a desired number of filter orders and a two-dimensional image filtering process.

11. The image processing apparatus according to claim 10, wherein m=n.

12. The image processing apparatus according to claim 9, wherein after processing a low-pass filter image through the Pascal triangle low-pass filtering method, the image processing apparatus further performs a weighting process to the low-pass filter image and a high-pass filter image of the image.

* * * * *